United States Patent [19]

Joerger

[11] 4,398,326

[45] Aug. 16, 1983

[54] COLLET UNCLAMPING MECHANISM

[75] Inventor: John R. Joerger, Milwaukee, Wis.

[73] Assignee: Kearney & Trecker Corporation, Milwaukee, Wis.

[21] Appl. No.: 279,328

[22] Filed: Jul. 1, 1981

[51] Int. Cl.[3] .............................................. B23Q 3/00
[52] U.S. Cl. ...................................... 29/26 A; 279/4; 408/239 R; 409/233
[58] Field of Search ............... 409/231, 233; 29/26 R, 29/26 A; 279/4, 1 R; 408/238, 239 R, 239 A

[56] References Cited

U.S. PATENT DOCUMENTS 2,687,186 8/1954 Erikson .................................. 184/27
4,172,683 10/1979 Shimajiri .............................. 409/233

FOREIGN PATENT DOCUMENTS 54-113580 9/1979 Japan ................................... 409/233
197709 9/1977 U.S.S.R. ............................. 409/233

Primary Examiner—William R. Briggs
Attorney, Agent, or Firm—Quarles & Brady

[57] ABSTRACT

Pressurized hydraulic fluid for energizing the collet unclamping mechanism of a machining center is supplied through a first solenoid valve from an accumulator which is charged by a piston pump. The piston pump is attached to the machining center between the Z axis slide and the Z bed so that as the Z axis slide is moved to a home position at the outset of a tool change cycle, the pump charges the accumulator, allowing pressurized hydraulic fluid to be admitted into the collet unclamping cylinder through the solenoid control valve in response to machining center control system commands. Following pressurization of the unclamping mechanism from the accumulator, both the unclamping mechanism and the piston pump drain to the oil sump to reduce any drag on the Z axis slide or on the unclamping mechanism itself.

5 Claims, 1 Drawing Figure

COLLET UNCLAMPING MECHANISM

BACKGROUND OF THE INVENTION

This invention relates generally to automatic tool changing machining centers having hydraulically actuated collet unclamping mechanisms and more particularly, to a mechanism for pressurizing the collet unclamping mechanism of a machining center.

Present day automatic tool changing tool machining centers such as are well known in the art, commonly employ a rotary driven spindle in which a cutting toolholder is retained by a set of Belleville washers or the like. To release the cutting toolholder secured in the spindle during a tool change cycle, a hydraulic cylinder secured opposite to the spindle so as to be coaxial with the toolholder, is actuated so that a ram at the end of the cylinder shaft biases the toolholder within the spindle against the Belleville springs to release the toolholder. Heretofore, a separate electrically driven hydraulic pump has been employed to pressurize the tool unclamping cylinder with hydraulic fluid. Such pumps are not only noisy, but are also expensive to purchase and to operate.

In contrast, the present invention concerns a mechanism to supply a hydraulic fluid to the machining center tool unclamping hydraulic cylinder which obviates the need for an electrically driven hydraulic pump.

It is an object of the present invention to provide an improved apparatus for pressurizing the collet unclamping mechanism of a machine center.

It is another object of the present invention to provide an improved apparatus for pressurizing the collet unclamping mechanism of a machining center which obviates the need for an electrically driven hydraulic pump.

BRIEF SUMMARY OF THE INVENTION

Briefly, in accordance with the preferred embodiment of the invention, apparatus for pressurizing the collet unclamping mechanism of a machining center comprises an accumulator for storing hydraulic fluid, typically oil under pressure. A first solenoid operated valve, actuated by the machining center numerical control system, couples the collet unclamping cylinder between the accumulator, so that the unclamping cylinder may be pressurized therefrom to release the cutting toolholder then in the spindle at the outset of the tool change cycle, and an oil drain tank or sump so that oil admitted to the unclamping cylinder from the accumulator can drain back into the oil drain tank following the completion of the tool change cycle. The accumulator is charged with oil from the oil dain tank by a piston pump, fastened on the machining center between the bed and the column so as to pump oil from the drain tank to the accumulator each time the column returns to its home position on the Z axis at the outset of a tool change cycle. A second solenoid valve is coupled between the inlet and outlet of the piston pump and is controlled by the machining center numerical control system to remain closed except during a tool change cycle, causing the oil pumped by the piston pump during intervals other than at the outset of the tool change cycle to flow directly back to the oil drain tank thereby reducing any drag on the column.

BRIEF DESCRIPTION OF THE DRAWING

The features of the invention believed to be novel are set forth with particularlity in the appended claims. The invention itself, however, both as to organization and method of operation, together with further objects and advantages thereof, may best be understood by reference to the following description taken in conjunction with the accompanying drawing in which:

DETAILED DESCRIPTION OF THE PREFERRED EMBODIMENT

Figure 1:
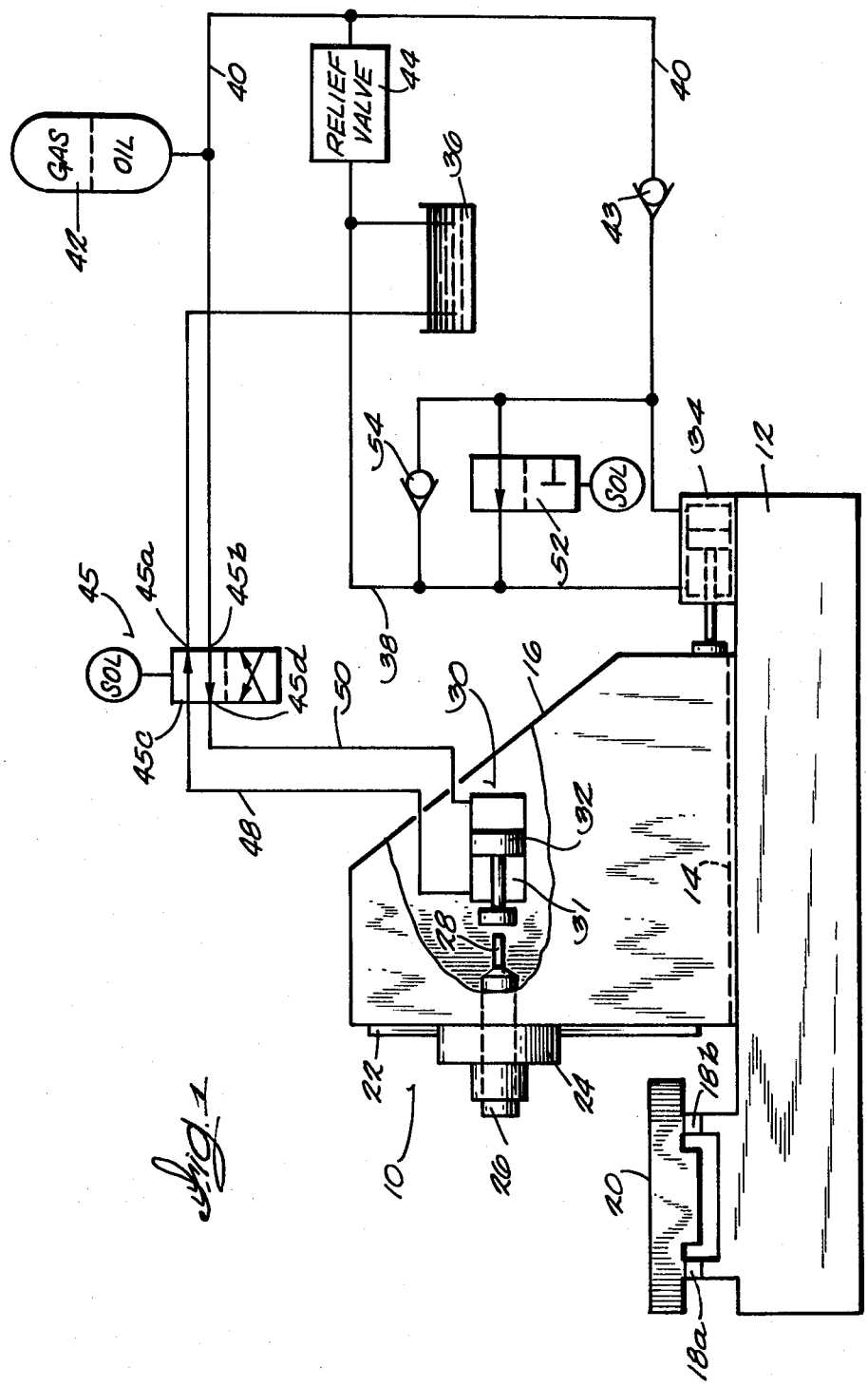
FIG. 1 is a block schematic diagram of the apparatus in accordance with the present invention for pressurizing the collet unclamping mechanism of an automatic tool changing machining center.

Referring now to FIG. 1, there is shown an automatic tool changing machining center 10 which, in the presently preferred embodiment, takes the form of a horizontal spindle machining center, comprised of a bed 12 on which a pair of ways 14 (only one of which is shown) is fastened in spaced parallelism along a first or a Z axis. A column or upright 16 is fastened on ways 14 by a set of gibs (not shown) for movement along the Z axis. Conventional means (not shown) such as a motorized ball screw and ball nut arrangement, are provided for propelling column 16 along the Z axis under control of the machining center numerical control system (not shown).

A second pair of ways 18a and 18b are fastened on bed 12 in spaced parallelism so as to be each perpendicular to ways 14. Slidably fastened on ways 18a and 18b is a worktable 20 which is propelled along ways 18a and 18b perpendicular to the path of travel of column 16 by conventional means (not shown) such as a motorized ball screw and ball nut arrangement. A third pair of ways 22 (only one of which is shown) are fastened in spaced parallelism on the face of column 16 adjacent to table 20 so as to be perpendicular to ways 14 and 18a and 18b. Slidably fastened to ways 22 is a spindlehead 24 which is movable on ways 22 along the face of column 16 perpendicular to the path of travel of table 20 by conventional means (not shown) such as a motorized ball nut and ball screw arrangement. A cutting tool carrying spindle 26 is journaled into spindlehead 24 for rotation about an axis parallel to the Z axis. A drive motor (not shown) rotatably drives spindle 26 in accordance with commands from the machine center numerical control system.

Spindle 26, which is dimensioned to receive a cutting tool in the bore thereof, is conventional in constuction and has a drawbar 28 coaxial within the bore in the spindle for engaging the rear end of the cutting toolholder in a known mannr to urge the toolholder into the spindle and to secure it therein. To release the toolholder engaged in the spindle, drawbar 28 is urged forwardly (leftwardly) by a hydraulic cylinder 30 fastened within spindlehead 24 so that the cylinder shaft 31 is coaxial with and adjacent to drawbar 28. Heretofore, when the toolholder disposed in spindlehead 34 is to be disengaged therefrom, cylinder 30 was pressurized with hydraulic fluid provided thereto by an electrically driven hydraulic pump. As indicated previously, such pumps are not only expensive, but are also noisy. In the present invention, the power necessary to pump hydraulic fluid into cylinder 30 to bias the piston 32 at the end of shaft 31 within cylinder 30 forwardly (lefwardly) to urge drawbar 28 forwardly to release the toolholder from spindle 26 is generated by the machine tool itself during intervals when column 16 moves rightwardly along the Z axis to a home position at the outset of a tool change cycle. A piston pump 34 is attached to machining center 10 between bed 12 and column 16. As column 16 moves rightwardly along the Z axis to a home position at the outset of a tool change cycle, pump 34 draws hydraulic fluid, typically oil, from a sump or drain tank 36 via line 38 to supply oil under pressure through line 40 to an accumulator 42 to charge the accumulator. A check valve 43 coupled between pump 34 and accumulator 42 prevents the flow of oil from the accumulator back into piston pump 34.

At the outset of machining center 10 operation, accumulator 42 is partially filled with oil. The remaining accumulator volume is consumed by an inert gas, such as nitrogen, which is at a moderate pressure. As more oil is pumped into accumulator 42 by piston pump 34 during intervals when upright 16 of machining center 10 moves rightwardly along the Z axis to its home position, the volume of nitrogen in the accumulator decreases, causing a corresponding increase in the pressure exerted on the oil within the accumulator. A relief valve 44 is coupled between line 40 and drain tank 36 and, should the pressure of oil in accumulator 42 and line 40 exceed a predetermined magnitude, relief valve 43 opens to carry oil from the accumulator into drain tank 36 so as to prevent a rupture of accumulator 42.

Accumulator 42 is coupled via line 40 to the first port 45a of a four port, two-way valve 45 which is solenoid operated in accordance with commands from the machining center numerical control system. The second port 45b of valve 44 is coupled via line 46 to oil drain tank 36. Ports 45c and 45d of valve 46 are coupled via a separate one of lines 48 and 50 to collet unclamping cylinder 30 so as to be in communication with the cylinder on opposite sides of piston 32 on cylinder shaft 31.

A two port, one-way solenoid operated valve 52 is coupled between the junction of pump 34 and check valve 42 and line 38. While valve 52 remains de-energized (i.e. open), the oil pumped by piston pump 34 is directed by solenoid operated valve 52 back through line 38 into drain tank 36. A check valve 54 is coupled in parallel with solenoid operated valve 52 to permit oil to flow from oil drain tank 36 into cylinder 34 as column 16 moves forwardly along bed 12.

During a tool change cycle, collet unclamping cylinder 30 is pressurized to release the toolholder engaged in spindle 26 of machining center 10 as follows. At the outset of a tool change cycle, solenoid operated valve 52 is actuated (closed) by the machining center numerical control system to prevent oil pumped by pump 34 from flowing back into drain tank 36 along line 38. With solenoid operated valve 52 now closed, pump 34 draws oil from drain tank 36 through line 38 to supply oil to accumulator 42 through line 40 as column 16 moves rightwardly along the Z axis to its home position. As indicated previously, when pump 34 pumps oil into accumulator 42, the increasing volume of oil in the accumulator displaces a corresponding volume of gas, thereby increasing the pressure on the oil in the accumulator. Following the pumping of oil into accumulator 42 to increase the pressure on the oil therein, solenoid operated valve 45 is actuated by the machining center numerical control system to couple accumulator 42 to line 50 to allow pressurized oil from the accumulator to flow into cylinder 30 to urge piston 32 therein leftwardly so that the ram at the end of cylinder shaft 31 bears against drawbar 28 to urge the drawbar lefwardly so as to release the toolholder in spindle 26. As the piston in cylinder 30 moves leftwardly, the oil previously remaining in the cylinder 30 is expelled through line 48 and passes through solenoid valve 45 into drain tank 36.

Once cylinder 30 has been pressurized to release the toolholder in spindle 26, solenoid operated valve 45 is deactuated, so that pressurized oil from the accumulator 42 now flows through valve 45 and line 48 into cylinder 30 to urge the piston therein rightwardly causing the oil previously admitted into the cylinder to be expelled through line 50 and solenoid operated valve 45 into the drain tank. At the completion of the tool change cycle, solenoid operated valve 52 is no longer energized forcing the valve open so that the oil pumped by the piston pump 34 as upright 16 moves rearwardly along the Z axis now flows back into the pump thereby reducing the drag on the column.

The foregoing describes an apparatus for pressurizing the collet unclamping cylinder of a machining center which utilizes the transverse motion of the column along the bed to actuate a piston pump to pressurize an accumulator which supplies oil at sufficient pressure to energize the collet unclamping cylinder.

Although the illustrative embodiment of the present invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

The principles of this invention having now been fully explained in connection with the foregoing, I hereby claim as my invention:

1. In combination with a numerically controlled machine tool having a bed, a member movable on said bed between a forward and a home position, a rotary driven cutting-tool carrying spindle rotatably carried in said member and a collet unclamping cylinder associated with said spindle for releasing a toolholder engaged in said spindle when said unclamping cylinder is pressurized with hydraulic fluid, an improved apparatus for pressurizing said unclamping cylinder with hydraulic fluid comprising:

a source of hydraulic fluid;

an accumulator containing a volume of inert gas and hydraulic fluid;

pump means fastened to said machine tool between said bed and said movable member for pumping hydraulic fluid from said source of hydraulic fluid into said accumulator to increase the volume of hydraulic fluid in said accumulator, thereby increasing the pressure of said fluid, as said movable member moves on said bed from its forward to its home position;

means for preventing hydraulic fluid pumped into said accumulator by said piston pump from flowing back into said piston pump from said accumulator; and means responsive to numerical control commands for coupling said collet unclamping cylinder between said accumulator and said source of hydraulic fluid to conduct hydraulic fluid from said accumulator into said unclamping cylinder to pressurize said unclamping cylinder at predetermined intervals and to conduct the hydraulic fluid from said unclamping cylinder into said source of hydraulic fluid during intervals other than said predetermined intervals, respectively.

2. The invention according to claim 1 wherein said means for coupling said collet unclamping cylinder between said accumulator and said source of hydraulic fluid comprises a four port, two-way solenoid operated valve whose first and second ports are coupled to said source of hydraulic fluid and to said accumulator, respectively, and whose third and fourth ports are coupled so as to be in communication with said collet unclamping cylinder on opposite sides of the piston disposed therein.

3. The invention according to claim 1 and further including a relief valve coupled between said accumulator and said source of hydraulic fluid for conducting hydraulic fluid from said accumulator into said source of hydraulic fluid when the pressure of hydraulic fluid in said accumulator rises above a predetermined magnitude.

4. The invention according to claim 1 and further including a solenoid operated valve coupled between piston pump and said source of hydraulic fluid for conducting hydraulic fluid pumped by said piston pump back to said source of hydraulic fluid in response to numerical control commands so as to reduce the drag on said machine tool movable member during said intervals other than said predetermined intervals.

5. The invention according to claim 1 and further including a second check valve coupled between said check valve and said source of hydraulic fluid for admitting hydraulic fluid pumped from said source of hydraulic fluid into said piston pump during intervals when said movable machine tool member moves from its home position to its forward position.

* * * * *